(12) United States Patent
Ripberger

(10) Patent No.: US 7,685,400 B2
(45) Date of Patent: Mar. 23, 2010

(54) STORAGE OF DATA BLOCKS OF LOGICAL VOLUMES IN A VIRTUAL DISK STORAGE SUBSYSTEM

(75) Inventor: Richard A Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 11/013,003

(22) Filed: Dec. 15, 2004

(65) Prior Publication Data

US 2006/0129785 A1    Jun. 15, 2006

(51) Int. Cl.
G06F 12/00 (2006.01)
G06F 9/26 (2006.01)
G06F 9/34 (2006.01)

(52) U.S. Cl. .......................................... 711/203; 711/4
(58) Field of Classification Search ................ 711/230, 711/206, 203, 4
See application file for complete search history.

(56) References Cited

U.S. PATENT DOCUMENTS

| | | | |
|---|---|---|---|
| 4,365,295 A * | 12/1982 | Katzman et al. ............. | 711/206 |
| 4,757,447 A   | 7/1988  | Woffiden | |
| 4,943,910 A * | 7/1990  | Nakamura ................... | 711/2 |
| 5,193,160 A   | 3/1993  | Tsubota | |
| 5,247,632 A   | 9/1993  | Newman | |
| 5,257,361 A   | 10/1993 | Doi et al. | |
| 5,404,485 A * | 4/1995  | Ban .......................... | 711/202 |
| 5,479,627 A * | 12/1995 | Khalidi et al. ............... | 711/205 |
| 5,539,899 A   | 7/1996  | Huynh et al. | |
| 5,600,819 A * | 2/1997  | Kamada et al. ............. | 711/169 |
| 5,784,709 A   | 7/1998  | McLellan et al. | |
| 6,308,247 B1 * | 10/2001 | Ackerman et al. .......... | 711/206 |

(Continued)

FOREIGN PATENT DOCUMENTS

EP    1096385 A1    5/2001

(Continued)

OTHER PUBLICATIONS

Peter F. Corbett and Dror G. Feitelson, ACM Transactions on Computer Systems, The Vesta Parallel File System, Aug. 1996, vol. 14, No. 3, pp. 225-248.*

(Continued)

*Primary Examiner*—Pierre-Michel Bataille
*Assistant Examiner*—Christopher D Birkhimer
(74) *Attorney, Agent, or Firm*—Dan Shifrin

(57) ABSTRACT

When data is stored in many storage subsystems, metadata, such as a sequence number, is also generated and stored with the data. When the data is accessed, the metadata is checked to ensure that the desired data element has been accessed. In conventional storage subsystems, data elements, such as logical blocks, are stored sequentially in logical pages of each logical volume. Consequently, sequence numbers closely correlate with block positions within the physical pages and sequence number/position patterns tend to repeat frequently and access errors may not be detected. Algorithms are provided to calculate new, offset, physical block positions which reduce the close association of sequence numbers and physical positions, thereby reducing such aliasing. The algorithms incorporate the logical volume number, the logical page number, or both, in addition to the logical block number. As a result, detection of access errors becomes more likely.

13 Claims, 3 Drawing Sheets

U.S. PATENT DOCUMENTS

| | | | |
|---|---|---|---|
| 6,324,627 B1 | 11/2001 | Kricheff et al. | |
| 6,393,544 B1 * | 5/2002 | Bryg et al. | 711/220 |
| 6,499,095 B1 | 12/2002 | Sexton et al. | |
| 6,564,311 B2 * | 5/2003 | Kakeda et al. | 711/207 |
| 6,646,917 B1 * | 11/2003 | Yoshimura | 365/185.11 |

FOREIGN PATENT DOCUMENTS

| | | | |
|---|---|---|---|
| JP | 5233452 A | 1/1996 | |

OTHER PUBLICATIONS

J. David Irwin, The Industrial Electronics Handbook, 1997, CRC Press LLC, pp. 66-67.*

"Files Systems, Physical View (Disk Allocation Methods)", Jan. 10, 2001, pp. 1-8, http://web.archive.org/web/20010110195100/http://www.cs.uregina.ca/~hamilton/courses/330/notes/allocate/allocate.html.*

* cited by examiner (Logical View)

STORAGE OF DATA BLOCKS OF LOGICAL VOLUMES IN A VIRTUAL DISK STORAGE SUBSYSTEM

TECHNICAL FIELD

The present invention relates generally to the virtualization of logical volumes on disk storage subsystems and, in particular, to increasing the accuracy by which sequence numbers are used to verify storage of logical data blocks in correct block positions within logical data volumes.

BACKGROUND ART

In a typical disk storage subsystem, the storage space of the physical disks attached to the storage subsystem is configured to appear to a host system as a collection of separately addressable logical storage volumes. When the host system requests access to a data element of a logical volume, the storage subsystem maps the address of the requested data element on the logical volume to a corresponding data element on an attached physical device and directs the access request to the correct physical location. Thus, logical devices or volumes are emulated by the storage subsystem and devices appear to the host system as a natively attached physical device. The host, therefore, is able to access logical devices or volumes independent of the physical space containing the actual data. For example, a single large physical storage space may be configured as several smaller virtual (logical) spaces. When the physical storage space comprises multiple units of media, a logical volume may span more than one such unit. Additionally, physical storage may be configured as logical volumes for use by multiple hosts and/or multiple operating systems. Details and other benefits of the virtualization of logical volumes are well known and will not be described further herein.

The virtualized logical volumes may be comprised of any type of physical storage including, without limitation, electronic memory (such as RAM or solid state memory), hard disks, RAID arrays, tape cartridges, optical discs and other media. Removable media may be (but need not be) contained with an automated data storage library.

In some storage subsystems, metadata is generated when data is written to storage and checked when the data is later read to ensure that the correct data element has been fetched. For example, when a data block is written to a SCSI disk, a sequence number comprising the two low-order bytes of the logical address of the block may be stored with the data itself. The sequence number is retrieved when the data is read and compared with the two low-order bytes of the logical address used to access the target block. If the data block was stored in the wrong location or if the wrong block was retrieved, the error will typically be detected.

In some storage subsystems, physical storage, such as hard disks, is virtualized by dividing the physical space in to fixed size "pages". Pages are then logically concatenated to create storage space for an emulated logical device or volume. The strength of sequence number verification may by compromised if the number of blocks in a page is an integral power of 2. For example, when the sequence numbers are generated from the two low-order bytes (16 bits) of the logical block addresses, there are $2^{16}$=64 KB possible sequence numbers. Table 1 illustrates a prior art arrangement of logical blocks (LV Blocks) in which, for convenience, each page has eight blocks and sequence number are 2 bits (ranging from 0-3).

TABLE 1

LOGICAL VOLUME 0 (Prior Art)

| LV Block No. | Sequence No. | Array Page No. | Array Block No. |
|---|---|---|---|
| 0 | 0 | 0 | 0 |
| 1 | 1 | 0 | 1 |
| 2 | 2 | 0 | 2 |
| 3 | 3 | 0 | 3 |
| 4 | 0 | 0 | 4 |
| 5 | 1 | 0 | 5 |
| 6 | 2 | 0 | 6 |
| 7 | 3 | 0 | 7 |
| 8 | 0 | 1 | 0 |
| 9 | 1 | 1 | 1 |
| 10 | 2 | 1 | 2 |
| 11 | 3 | 1 | 3 |
| 12 | 0 | 1 | 4 |
| 13 | 1 | 1 | 5 |
| 14 | 2 | 1 | 6 |
| 15 | 3 | 1 | 7 |
| 16 | 0 | 2 | 0 |
| 17 | 1 | 2 | 1 |
| 18 | 2 | 2 | 2 |
| 19 | 3 | 2 | 3 |
| 20 | 0 | 2 | 4 |
| 21 | 1 | 2 | 5 |
| 22 | 2 | 2 | 6 |
| 23 | 3 | 2 | 7 |
| 24 | 0 | 3 | 0 |

Because the number of blocks in a page is a power of 2 and exceeds the range of the sequence numbers, all pages begin and end with the same sequence number. On the other hand, if the number of blocks in a page is less than the range of sequence numbers, the progression of sequence numbers within the pages will still repeat periodically, but over some number of pages rather than at each page. In either configuration, such "aliasing" of sequence numbers among the blocks may result in a sequence number check failing to detect an error: a miscalculation of which page is mapped to page A of volume B might cause access instead to page C of volume D. Similarly, an attempt to access a block stored in position F of page A of volume B may instead mistakenly access the block stored in position F of page C of volume B. In both instances, blocks have the same sequence number and an incorrect access (or storage) would go undetected.

Several solutions have been suggested. In one, the page sizes could be created with a number of blocks which is not an exact power of 2. However, because volumes are typically an exact multiple of a power of 2 in size, alignment to page boundaries, which prevents wasted space, becomes difficult. Moreover, arithmetic in block address calculations becomes more complicated.

In another suggestion, one or more additional fields, such as the page number, may be included in the metadata and stored with the existing sequence number. However, the overhead required to implement such a solution reduces storage capacity otherwise used for customer data. And, it would require significant modification to existing systems which are programmed to handle only a single, sequence number, field.

In alternative suggestions, the page number or the volume number may be added to the sequence number. However, in the former arrangement, every page N of every volume would have the same set of modified sequence numbers and in the latter arrangement, every page of a particular volume would have the same set of modified sequence numbers. If both the page number and volume number are added to the sequence number, aliasing may be avoided but performance would be degraded when data is transferred to the new arrangement because the sequence fields would have to be re-synthesized on the fly.

Consequently, it remains desirable to reduce sequence number aliasing without adversely affecting system performance.

SUMMARY OF THE INVENTION

The present invention provides a virtual storage system, a method and a computer program product which reduce sequence number aliasing without adversely affecting system performance. New block positions, which are offset from the prior art positions, are calculated and reduce the close association of sequence numbers and positions. The algorithms used incorporate the logical volume number, the array page number, or both, in addition to the logical block number. As a result, detection of access errors becomes more likely.

More particularly, a storage area is divided into a plurality of pages and a plurality of block positions is allocated to each page, each block position having a position number. A plurality of pages are logically concatenating to create storage space for each of a plurality of logical volumes. Each data block of the logical volume is assigned a sequence number. Additionally, a physical block position within a physical storage page is calculated for a data block N on logical page m of a logical volume n as (N+T) modulo x, where T is a number and each page is x blocks in size. Then, the data block N and the corresponding sequence number are stored in the calculated physical block position within the page m of the logical volume n.

In one embodiment, the number T comprises the logical page number m. In another embodiment, the number T comprises the logical volume number n. And, in still another embodiment, the number T comprises the logical volume number n plus the logical page number m, thereby providing the highest level of protection against aliasing.

The sequence number of a logical block is preferably derived from or assigned the value of the y least significant bits of the logical address used by the host to access the block of the logical volume. When an attempt is made to access the block, the data block N at the logical address and the corresponding sequence number are read. The sequence number is compared to the y least significant bits of the logical block address. If they do not match, an error has been detected.

Because of the block position offsets, the correlation between physical block positions within physical pages and sequence numbers is eliminated. The resulting progression of block storage reduces the probability of aliasing.

DETAILED DESCRIPTION OF THE PREFERRED EMBODIMENT

Figure 1:
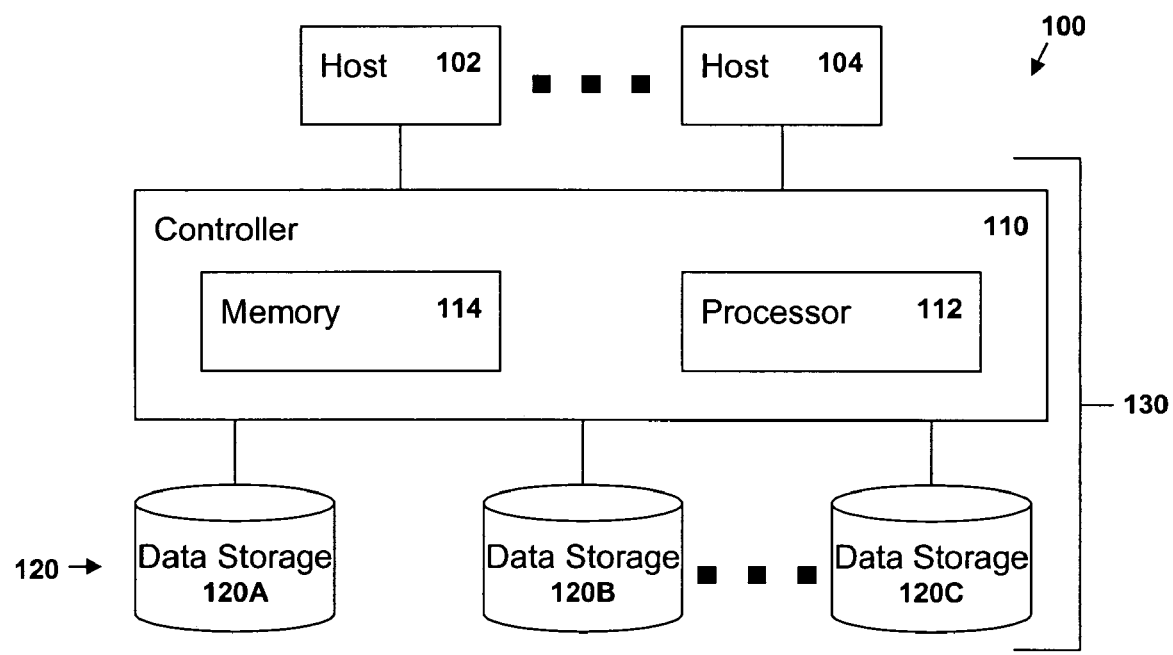
FIG. 1 is a block diagram of a data processing system in which the present invention may be implemented.

FIG. 1 is a block diagram of a data processing system 100 in which the present invention may be implemented. The system 100 includes one or more host systems 102 and 104, and a storage subsystem 130 comprised of a controller 110 and storage space 120 in the form of one or more data storage devices 120A, 120B and 120C. The controller includes a processor 112 and memory 114 as well as appropriate interfaces through which the hosts 102 and 104 and the storage devices 120A, 120B and 120C are attached. The processor 112 is programmed with instructions stored in the memory 114 for managing I/O operations requested by the host systems 102, 104. The storage space 120 may be any type of removable or fixed physical storage including, without limitation, electronic memory (such as RAM or solid state memory), hard disks, RAID arrays, tape cartridges, optical discs and other media. Removable media may be (but need not be) contained with an automated data storage library. Although the present invention will be described primarily in terms of hard disk subsystems, it is also applicable to other types of data storage.

Figure 2:
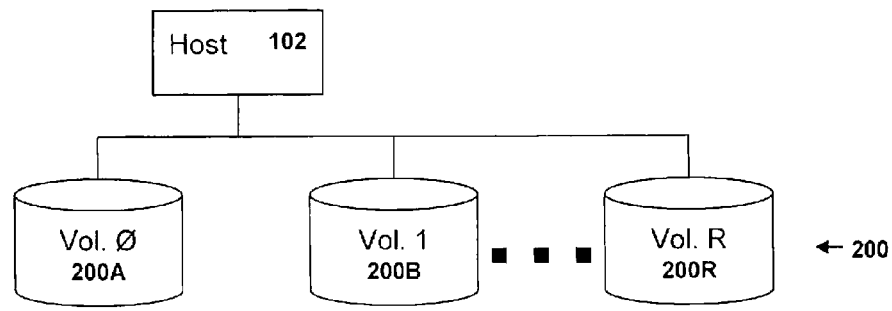
FIG. 2 is a logical view of the data processing system of FIG. 1.
Figure 3:
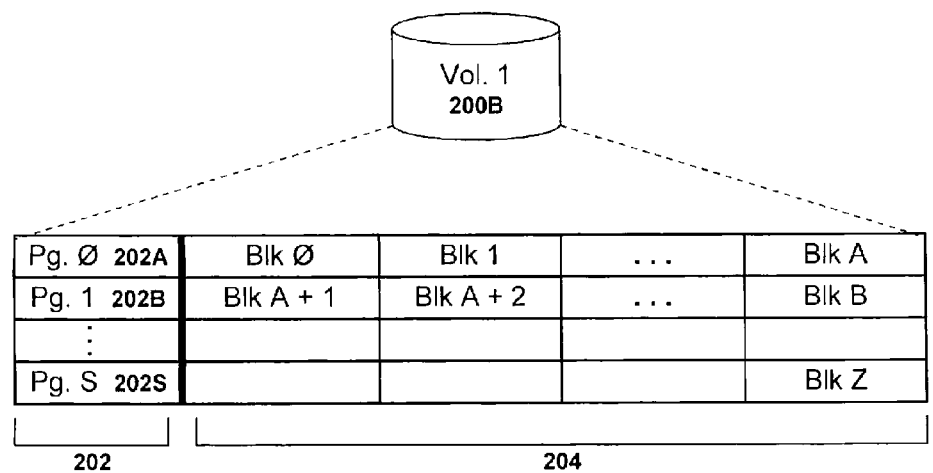
FIG. 3 is a logical view of one logical volume showing an arrangement of logical blocks within array pages.

As illustrated in FIG. 2, the storage space 120 may be "virtualized" by the controller 110 creating emulated logical devices or volumes 200 addressable by the host system 102. As illustrated in the prior art depiction of FIG. 3, the logical volume 120 consists of a set of contiguously addressable logical blocks that are organized into consecutive pages 202 consisting of a fixed number of logical blocks. For example, Logical Vol. 1 200B comprises pages 202A, 202B, ..., 202S. Each page 202, in turn, comprises an array of logical block positions 204, each of which contain a logical block. In page 0, logical blocks 0-A are stored in array positions 0-A; in page 1, logical blocks A+1 through B are stored in array positions 0-A, and so forth. The sizes of the volumes, pages and blocks may be any selected values. In one storage subsystem, each page 202 is allocated 1 GB and each block 204 is 512 bytes (i.e. 2 MB blocks per page). Moreover, the sequence number assigned to a logical block is derived or assigned the value of the y least significant bits of the block's logical block address. If y equals 2, the sequence numbers range from 0 to 64 KB−1 before repeating.

In a similar fashion, the physical storage attached to the controller can be considered a number of physical storage spaces, each divided into a number of contiguously addressable pages, each with a fixed number of contiguously addressable physical blocks, each physical block being capable of storing one logical block with its associated sequence number. The logical pages of a logical volume are mapped to an arbitrary set of physical pages in the physical storage spaces such that there is a one to one mapping between a logical page of a logical volume and a physical page in the collection of physical storage spaces. Each storage space may be a single physical device, an array of physical devices such as a RAID array, or any combination of storage media which creates a range of contiguously addressable physical blocks that are organized into a range of contiguously addressable physical pages.

In certain prior storage subsystems which did not use a paged storage concept, the entire contiguous range of logical blocks associated with a logical volume was stored in a contiguous range of physical blocks in a storage space. In general, there was no specific correlation between the sequence number of a logical block and its physical location in the storage space. However, the absence of a paged storage concept in these storage subsystems resulted in deficiencies in the virtualization capabilities such as allowing the reuse of space after deleting a logical volumes in the middle of a physical storage space. On storage subsystems which implement a paging scheme to enable these virtualization capabilities and, additionally, which have the sequence number checking and a fixed page length in blocks being a power of two, a simple mapping which uses the same offset for a logical block within both the physical and logical page introduces a fixed correlation between sequencing number and page offsets such that the checking of sequence numbers would not detect an error in page addressing. In contrast to prior art, logical blocks in the storage system 100 in which the present invention is implemented are stored in physical page positions which do not necessarily correlate with their sequence numbers or with what was, in the prior art, the sequential progression of blocks based on their logical block numbers. Rather, a block position is offset from the prior progression by a number which reflects the volume number in which the block is stored, the page in which the block is stored, or both.

Table 2 illustrates an arrangement of logical blocks and corresponding sequence numbers within the physical pages of an exemplary logical volume 0 in accordance with the present invention where the sequence number is two bits in length and the page size is 8 blocks.

TABLE 2

LOGICAL VOLUME 0

| LV Block No. | Sequence No. | Logical Page No. | Offset Applied to Physical Page | Logical Block Placement in Physical Page |
|---|---|---|---|---|
| 0 | 0 | 0 | 0 | 0 |
| 1 | 1 | 0 | 0 | 1 |
| 2 | 2 | 0 | 0 | 2 |
| 3 | 3 | 0 | 0 | 3 |
| 4 | 0 | 0 | 0 | 4 |
| 5 | 1 | 0 | 0 | 5 |
| 6 | 2 | 0 | 0 | 6 |
| 7 | 3 | 0 | 0 | 7 |
| 8 | 0 | 1 | 1 | 1 |
| 9 | 1 | 1 | 1 | 2 |
| 10 | 2 | 1 | 1 | 3 |
| 11 | 3 | 1 | 1 | 4 |
| 12 | 0 | 1 | 1 | 5 |
| 13 | 1 | 1 | 1 | 6 |
| 14 | 2 | 1 | 1 | 7 |
| 15 | 3 | 1 | 1 | 0 |
| 16 | 0 | 2 | 2 | 2 |
| 17 | 1 | 2 | 2 | 3 |
| 18 | 2 | 2 | 2 | 4 |
| 19 | 3 | 2 | 2 | 5 |
| 20 | 0 | 2 | 2 | 6 |
| 21 | 1 | 2 | 2 | 7 |
| 22 | 2 | 2 | 2 | 0 |
| 23 | 3 | 2 | 2 | 1 |
| 24 | 0 | 3 | 3 | 3 |
| ... | | | | |
| 56 | 0 | 7 | 7 | 7 |
| ... | | | | |
| 64 | 0 | 8 | 0 | 0 |

The first column contains the logical block numbers, the second column contains the corresponding sequence numbers and the third column contains the logical page number. The fourth column contains the offset used to adjust from the position of the logical block within the logical page to the position of the logical block on the physical page calculated from (m+n) modulo 8 (where 8 is the number of block positions in each page), where m is the logical page number and n is the logical volume number (0 in Table 2). And, the fifth column contains the block position calculated from (N+m+n) modulo 8. Because there are only 8 block positions in each page, the progression of sequence numbers, offsets and block positions repeats beginning with logical block 64, in page 8.

Table 3 illustrates the arrangement of logical blocks and corresponding sequence numbers within the array pages of an exemplary logical volume 1 in accordance with the present invention.

TABLE 3

LOGICAL VOLUME 1

| LV Block No. | Sequence No. | Logical Page No. | Offset Applied to Array Page | Logical Block Placement in Physical Page |
|---|---|---|---|---|
| 0 | 0 | 0 | 1 | 1 |
| 1 | 1 | 0 | 1 | 2 |
| 2 | 2 | 0 | 1 | 3 |
| 3 | 3 | 0 | 1 | 4 |
| 4 | 0 | 0 | 1 | 5 |
| 5 | 1 | 0 | 1 | 6 |
| 6 | 2 | 0 | 1 | 7 |
| 7 | 3 | 0 | 1 | 0 |
| 8 | 0 | 1 | 2 | 2 |
| 9 | 1 | 1 | 2 | 3 |
| 10 | 2 | 1 | 2 | 4 |
| 11 | 3 | 1 | 2 | 5 |
| 12 | 0 | 1 | 2 | 6 |
| 13 | 1 | 1 | 2 | 7 |
| 14 | 2 | 1 | 2 | 0 |
| 15 | 3 | 1 | 2 | 1 |
| 16 | 0 | 2 | 3 | 3 |

While the sequence numbers remain the same relative to the logical block numbers, n now equals 1 and therefore the offsets are advanced by one relative to those in Logical Volume 0.

Figure 4:
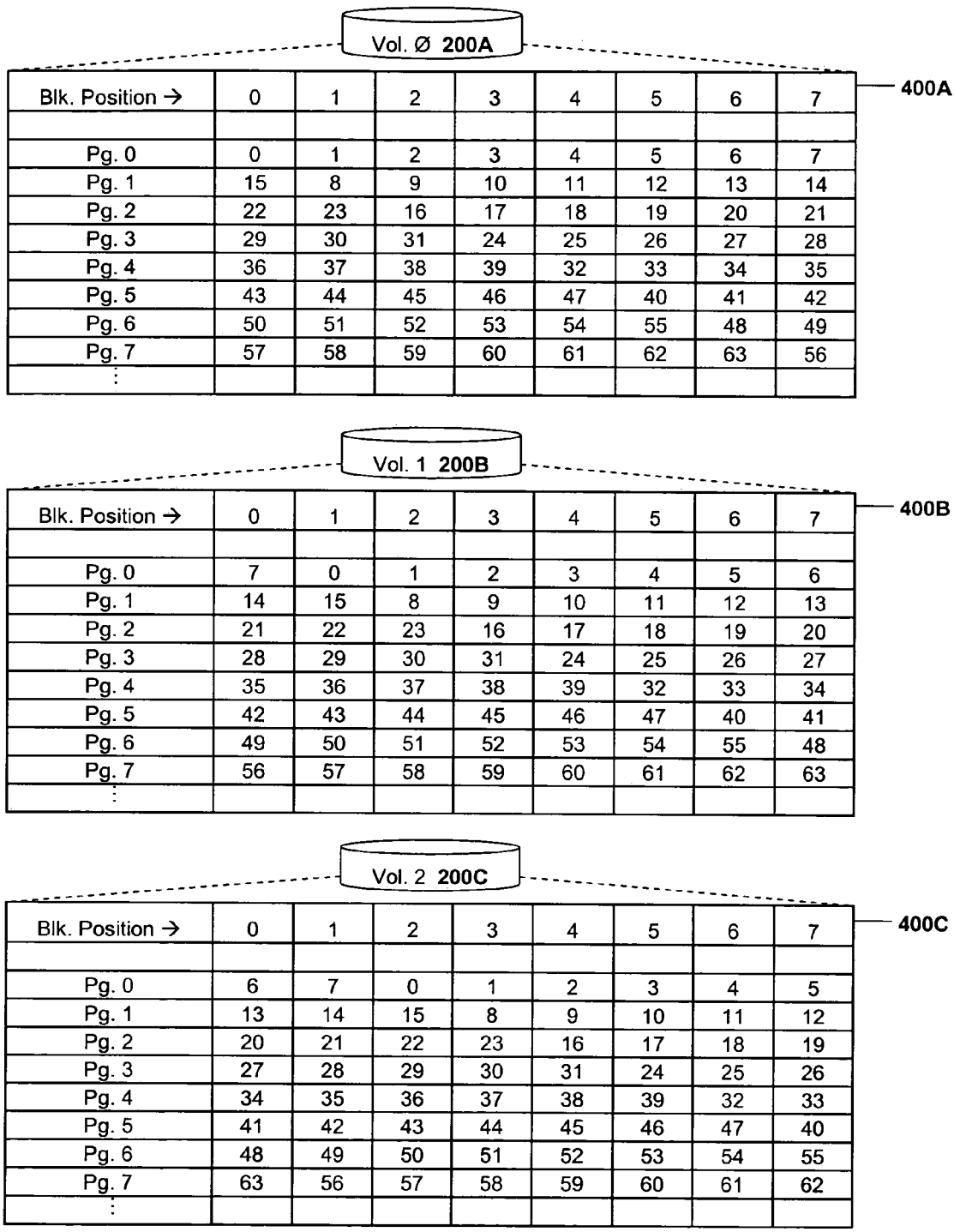
FIG. 4 is a logical view of several logical volumes in which logical blocks are stored in accordance with the present invention.

FIG. 4 illustrates the manner in which block storage positions advance over the several exemplary logical volumes 200A, 200B, 200C of FIG. 2 as logical block numbers increase. In each array 400A, 400B, 400C, the first row contains the number of each of eight block positions of a physical page and the first column contains the logical page numbers within each logical volume. Each array entry is the number of the logical block stored in the indicated physical block position. For example, logical block number 0 of logical volume 0 is stored in position 0 of the physical page mapped to logical page 0. Logical block 1 of logical volume 0 is stored in position 1 of the physical page mapped to logical page 0; logical block 0 of logical volume 1 is stored in position 1 of the physical page mapped to logical page 0; and logical block 16 of logical volume 2 is stored in position 4 of the physical page mapped to logical page 2. More generally, a logical block number N which resides on logical page m of logical volume n is stored in position (N+m+n) modulo P of the physical page mapped to logical page m of logical volume n, where P is the number of block positions in each logical page.

It can be seen from the Tables and FIG. 4 that the logical blocks on logical volume J with sequence number K have the same positions within a physical block only in every Nth logical page where N=MAX(P,Q) when P is the number of logical blocks per page and Q equals the number of unique sequence numbers, P and Q both being powers of two. Similarly, the positions of logical blocks within physical blocks align for two different logical volumes I and J only if the absolute value of I−J=P. Depending on the number of blocks in each page and the number of unique sequence numbers, the problem of aliasing is significantly reduced. In contrast, with the prior art, every logical block N of every logical volume that accessed any physical page at the appropriate offset for this logical block would find a physical block with the correct sequence number.

Extending the above-described concepts to large scale virtualization of storage spaces, the sequence number may be the two low-order bytes of each block's logical block address (resulting in 64K sequence numbers), each logical page may be 2M logical blocks in size and 512 bytes (for a total of 1 GB of data). On logical page 0 of logical volume 0, logical block 0 would be at position 0 of its associated physical page and have a sequence number of 0. On logical page 0 of logical volume 0, logical block N would be at position (0+0+N) modulo 2M of its associated physical page and have a sequence number of N modulo 64K. On logical page 1 of logical volume 0, logical block 2M would be at position 0+0+1=1 and have a sequence number of 0. On logical page 1 of logical volume 0, logical block 2M+N would be at position (0+1+N) modulo 2M of its associated physical page and have a sequence number of N modulo 64K. More generally, on logical page m of logical volume n, logical block 0 would be at position (n+m+0) modulo 2M of its associated physical page and have a sequence number of 0. And, on logical page m of logical volume n, logical block N would be at position (n+m+N) modulo 2M of its associated physical page and have a sequence number of N modulo 64K.

Because the blocks are rotated through each page based on the sum of the volume number and the page number, an access to the wrong page at the correct block offset is likely to be detected when the sequence number is compared to the block position.

Aliasing may also be reduced if only the logical volume number n, or only the array page number m, is included in calculating the new block position. In the first instance, the new position will equal (n+N) modulo P and in the second instance, the new position will equal (m+N) modulo P (where N again is the logical block number and P is the number of block positions in each page).

Aliasing of logical blocks at the same physical offset may also be reduced by employing any algorithm which results in changing the position of the logical blocks within the physical page such that the distribution of logical block identifiers N are more uniform.

It is important to note that while the present invention has been described in the context of a fully functioning data processing system, those of ordinary skill in the art will appreciated that the processes of the present invention are capable of being distributed in the form of a computer readable storage medium of instructions and a variety of forms and that the present invention applies regardless of the particular type of signal bearing storage media actually used to carry out the distribution. Examples of computer readable storage media include recordable-type media such as a floppy disk, a hard disk drive, a RAM, and OD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to an apparatus, the need in the art may also be met by a method of storing data blocks of logical volumes in a virtual disk storage subsystem, a computer program product containing instructions for storing data blocks of logical volumes in a virtual disk storage subsystem, or a method for deploying computing infrastructure comprising integrating computer readable code into a computing system for storing data blocks of logical volumes in a virtual disk storage subsystem.

What is claimed is:

1. A method for processing logical data blocks in a storage system that virtualizes logical volumes by using attached physical storage, comprising:

dividing a physical storage space into a plurality of physical pages;

allocating a plurality of physical blocks to each physical page, each physical block having a position number, and each physical page having the same number of physical blocks;

logically concatenating a plurality of physical pages to create storage space for each of a plurality of logical volumes, each logical volume having a logical volume number n, whereby:

each physical page is mapped to a logical page of one of the plurality of logical volumes, each logical page having a logical page number m;

the logical pages are ordered from the logical volume's perspective; and each logical page contains the same number of logical blocks as a physical page contains physical blocks;

assigning to each logical block an associated sequence number N;

calculating a physical block position within a physical page for each logical block of a logical page m of a logical volume n as (N+T) modulo x, where T is a number selected from the group comprising m, n and m+n, and each logical page is x logical blocks in size, whereby no correlation exists between the physical block positions of the logical blocks within physical pages and the associated sequence numbers of the logical blocks; and storing each logical block and the associated sequence number N in the calculated physical block position within the physical page associated with the logical page of the logical volume.

2. The method of claim 1, wherein the sequence number of each logical block corresponds to the low order y bits of the logical address of the logical block, the method further comprising:

accessing a logical block by its logical block address;

reading the accessed logical block and the associated sequence number from the calculated physical block position of the appropriate physical page;

comparing the sequence number with low order y bits of the logical block address of the accessed logical block; and determining if these quantities are equal and indicating an access error if not equal.

3. The method of claim 1, wherein:

the sequence number of each logical block corresponds to the low order y bits of the logical address of the logical block, whereby the sequence numbers are within a range of 0 to $2^y-1$; and the sequence numbers are assigned to logical blocks as N modulo $2^y$.

4. A storage system that virtualizes logical volumes by using attached physical storage, comprising:

a physical storage area;

a physical storage area divided into physical pages, each page having a plurality of physical blocks identified with the physical page by a physical block position number;

a plurality of logical volumes, each logical volume having a logical volume number n and comprising a plurality of concatenated physical pages, each physical page mapped to a logical page of one of the plurality of logical volumes and each logical page having a logical page number m;

a plurality of logical blocks, each logical block having a logical block address and an associated sequence number N;

means for calculating a physical block position for a logical block of a logical page of a logical volume as (N+T) modulo x, where T is a number selected from the group comprising m, n and m+n, and each logical page is x logical blocks in size, whereby no correlation exists between the physical block positions of the logical blocks within physical pages and the associated sequence numbers of the logical blocks; and means for storing each logical block in the calculated physical block position.

5. The storage system of claim 4, wherein:

the storage area comprises a disk-based storage subsystem; and the means for calculating comprises a controller.

6. The storage system of claim 4, wherein:

the sequence number of each logical block corresponds to the low order y bits of the logical address of the logical block, whereby the sequence numbers are within a range of 0 to $2^y-1$; and the storage system further comprises means for assigning the sequence numbers to logical blocks as N modulo $2^y$.

7. The storage system of claim 4, wherein the sequence number of each logical block corresponds to the low order y bits of the logical address of each logical block, the storage system further comprising:

means for accessing a logical block by its logical block address;

means for reading the accessed logical block and the associated sequence number from the calculated physical position;

means for comparing the sequence number with the logical block address of the accessed logical block; and means for determining if the sequence number is equal to the low order y bits of the logical block address and detecting an access error when not equal.

8. A computer program product of a computer readable storage medium usable with a programmable computer, the computer program product having computer-readable code embodied therein for processing logical blocks in the computer-readable code comprising instructions for:

dividing a physical storage area into a plurality of physical pages;

allocating a plurality of physical blocks to each physical page;

logically concatenating a plurality of physical pages to create storage space for each of a plurality of logical volumes, each physical page mapped to a logical page of one of the plurality of logical volumes and each logical page having a logical page number m;

assigning to each logical block an associated sequence number N;

calculating a physical block position for a logical block of a logical page of a logical volume as (N+T) modulo x, where T is a number selected from the group comprising m, n and m+n, and each logical page is x logical blocks in size, whereby no correlation exists between the physical block positions of the logical blocks within physical pages and the associated sequence numbers of the logical blocks; and storing each logical block and the associated sequence number N in the calculated physical block position within the physical page associated with the logical page of the logical volume.

9. The computer program product of claim 8, wherein:

the sequence number of each logical block corresponds to the low order y bits of the logical address of the logical block, whereby the sequence numbers are within a range of 0 to $2^y-1$; and the sequence numbers are assigned to logical blocks as N modulo $2^y$.

10. The computer program product of claim 8, wherein the sequence number of each logical block corresponds to the low order y bits of the logical address of the logical block, the computer-readable code further comprising instructions for:

accessing a logical block by its logical block address;

reading the accessed logical block and the associated sequence number from the calculated physical position;

comparing the sequence number with the accessed logical block address of the logical block; and determining if the sequence number is equal to the low order y bits of the logical block address and indicating an access error if not equal.

11. A method for deploying computing infrastructure, comprising integrating computer readable code into a computing system, wherein the code, in combination with the computing system, is capable of performing the following:

dividing a physical storage space into a plurality of physical pages;

allocating a plurality of physical blocks to each physical page, each physical block having a position number, and each physical page having the same number of physical blocks;

logically concatenating a plurality of physical pages to create storage space for each of a plurality of logical volumes, each logical volume having a logical volume number n, whereby:

each physical page is mapped to a logical page of one of the plurality of logical volumes, each logical page having a logical page number m;

the logical pages are ordered from the logical volume's perspective; and each logical page contains the same number of logical blocks as a physical page contains physical blocks;

assigning to each logical block an associated sequence number N;

calculating a physical block position within a physical page for a logical block of a logical page m of a logical volume n as (N+T) modulo x, where T is a number selected from the group comprising m, n and m+n, and each logical page is x logical blocks in size, whereby no correlation exists between the physical block positions of the logical blocks within physical pages and the associated sequence numbers of the logical blocks; and storing each logical block and the associated sequence number N in the calculated physical block position within the physical page associated with the logical page of the volume.

12. The method of claim 11, wherein the sequence number of each logical block corresponds to the low order y bits of the logical address of the logical block, and the code, in combination with the computing system, is further capable of performing the following:

accessing a logical block by its logical address;
reading the accessed logical block and the sequence number from the calculated physical block position of the appropriate physical page;
comparing the sequence number with low order y bits of the logical block address of the accessed logical block; and
determining if these quantities are equal and indicating an access error if not equal.

13. The method of claim 11, wherein:
the sequence number of each logical block corresponds to the low order y bits of the logical address of the logical block, whereby the sequence numbers are within a range of 0 to 2y−1; and
the sequence numbers are assigned to logical blocks as N modulo 2y.

* * * * *